March 11, 1958  C. A. COBB  2,826,367
AUTOMATIC FLUID MIXING VALVE
Filed Nov. 14, 1955  2 Sheets-Sheet 1
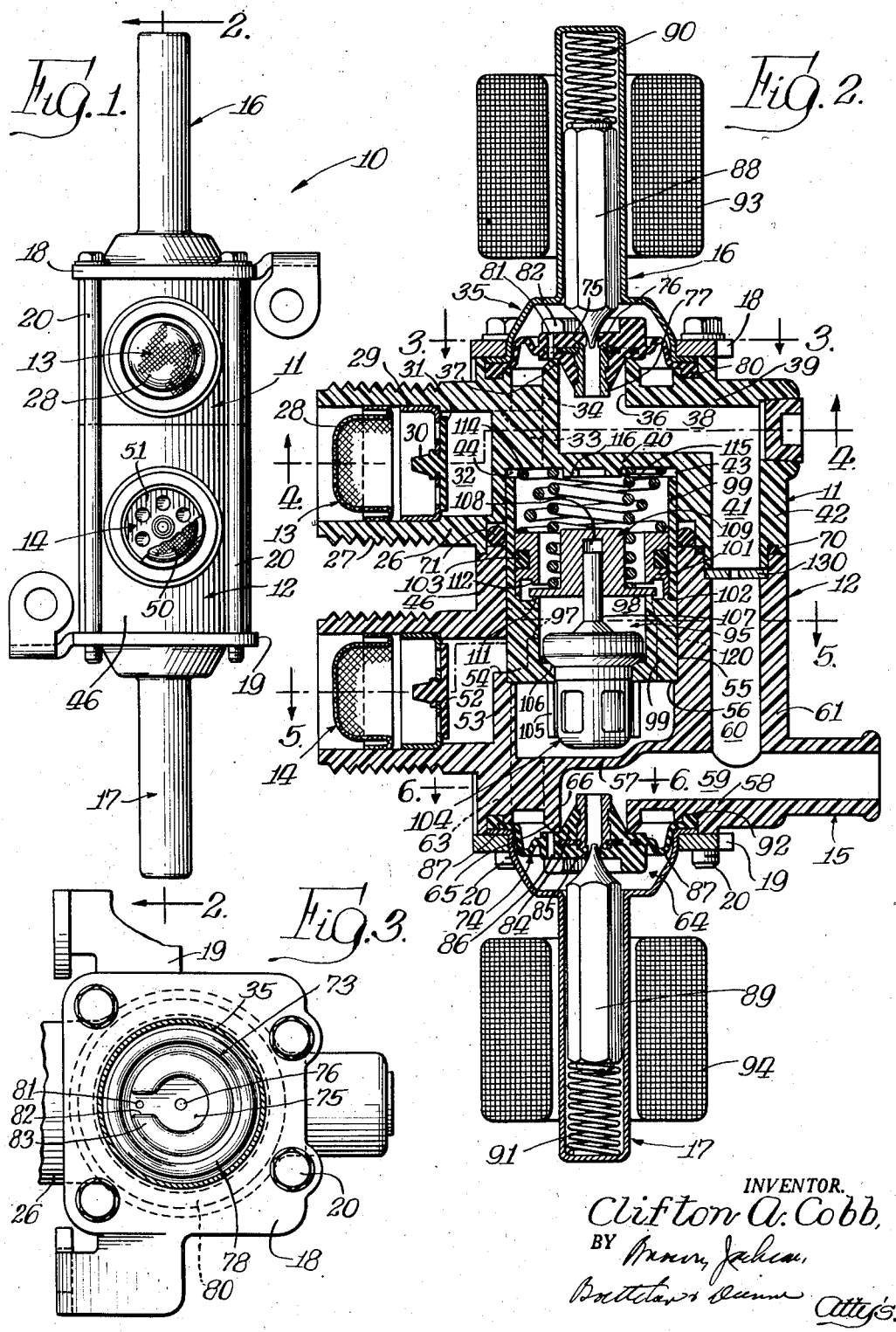
INVENTOR.
Clifton A. Cobb,
BY
ATTYS.

March 11, 1958 C. A. COBB 2,826,367
AUTOMATIC FLUID MIXING VALVE
Filed Nov. 14, 1955 2 Sheets-Sheet 2
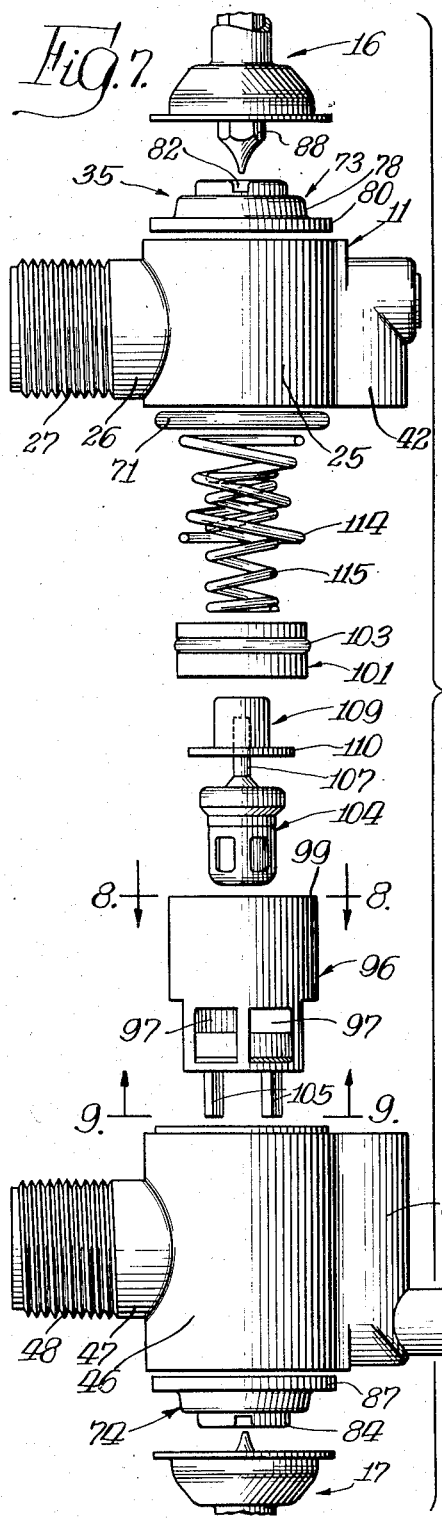
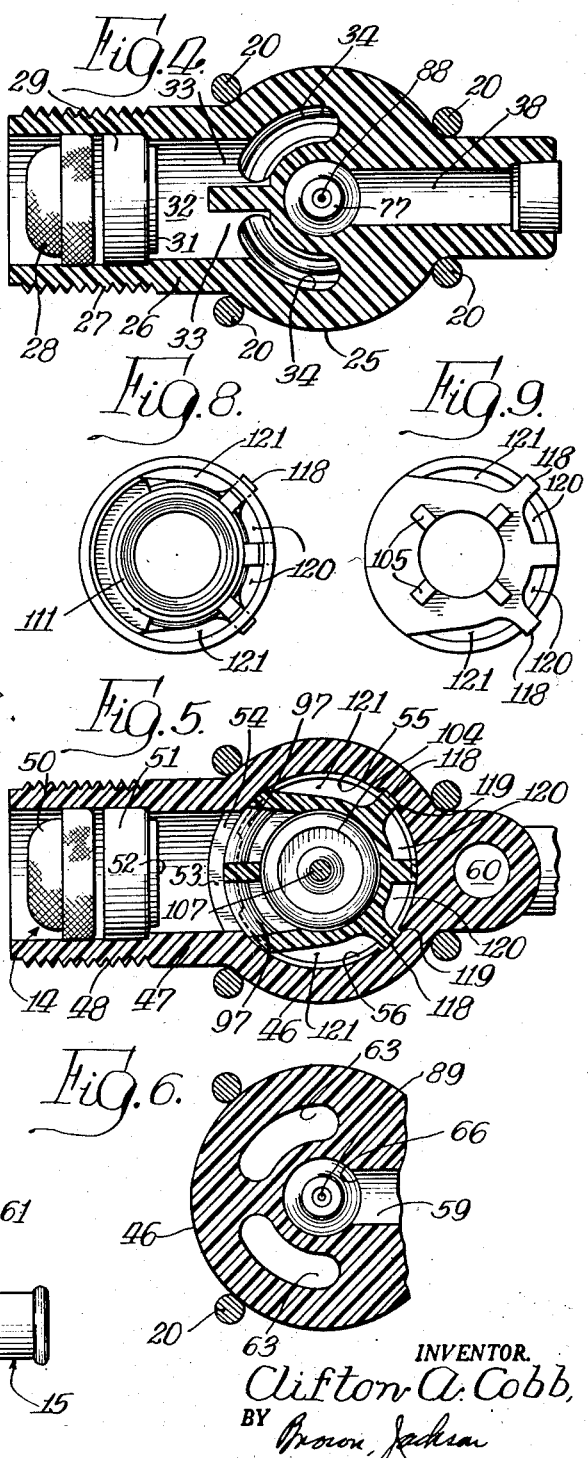
INVENTOR.
Clifton A. Cobb,
BY
ATTYS.

United States Patent Office 2,826,367
Patented Mar. 11, 1958

2,826,367

AUTOMATIC FLUID MIXING VALVE

Clifton A. Cobb, St. Joseph, Mich., assignor to Whirlpool Corporation, a corporation of Delaware Application November 14, 1955, Serial No. 546,425

5 Claims. (Cl. 236—12)

The present invention concerns valve mechanisms generally and more particularly relates to a thermostatically controlled mixing valve for intermixing two or more fluids of dissimilar temperature in predetermined amounts to gain an intermixed liquid of preselected temperature.

In brief, the invention concerns an improved mixing valve having provision for the intake of "hot" and "cold" fluids, a pair of pilot control valves operated by solenoid mechanisms or other operating means for admitting such hot and cold fluids to a discharge passageway or outlet and a thermostatically activated valve mechanism arranged to selectively control and govern the amount of hot and cold fluids introduced to a mixing chamber from whence they are discharged to the said discharge outlet in an intermixed state; the temperature of the intermixed fluid being intermediate the intake temperatures for the hot and cold fluids. Selective operation of the pilot control valve means enables the valve mechanism to discharge either hot or warm liquids, the temperature of such warm liquid being greater than the intermixed fluid produced by the mixing chamber so that the total end effect of the valve's operation is productive of fluids of three temperatures which will hereinafter be referred to as hot, warm and medium for identification purposes.

The improved valve of this invention finds general utility and application in such devices as laundry washing machines, dish washing machines, and other devices of a similar nature wherein the intermixture of liquids at different temperatures is required.

The main object of this invention is to provide a new and improved mixing valve having improved features of construction and assembly whereby such may be produced at reduced cost without sacrifice of quality or reliability.

Another object of this invention is to provide a new and improved mixing valve capable of intaking two fluids of unlike temperature and discharging fluids or liquids of three distinct temperatures.

A still further object of the invention is to provide an improved mixing valve having a simplified construction and assembly of parts which promote reliability of function.

Still another object of the invention is to provide a new and improved mixing valve embodying improved means for intermixing liquids of dissimilar temperature to produce an intermixed discharge product of intermediate temperature; the improved mixing valve means being thermostatically responsive to the temperature of the supply liquids whereby the latter are proportioned in predetermined quantities to produce an intermixture having a desired temperature.

The above and further objects, features and advantages of this invention will be apparent to those familiar with the art from the following detailed description and specifications therefor and will be understood more readily in conjunction with the preferred embodiment of the invention as found in the accompanying drawings.

In the drawings:

Figure 1 is an end elevational view of the assembled mixing valve of this invention;

Figure 2 is a cross-sectional view taken substantially along the longitudinal center line of the valve shown in Figure 1;

Figure 3 is a cross-sectional view taken substantially at line 3—3 of Figure 2 and looking in the direction of the arrows thereon;

Figure 4 is another cross-sectional view taken substantially at line 4—4 of Figure 2 showing details of internal chambering for the passage of "hot" liquids;

Figure 5 is a cross-sectional view taken substantially at line 5—5 of Figure 2 and looking in the direction of the arrows thereon and showing chambering employed for the intake of "cold" liquids;

Figure 6 is a cross-sectional view taken substantially at line 6—6 of Figure 2 looking in the direction of the arrows thereon;

Figure 7 is an exploded view in side elevation showing the various elements of my new valve and their relationship of assembly;

Figure 8 is a top plan view taken at line 8—8 of Figure 7 and looking in the direction of the arrows thereon to show internal details of an insert sleeve defining the mixing chamber of my valve; and Figure 9 is a bottom plan view of the insert sleeve shown in Figure 8, as viewed from line 9—9 of Figure 7.

As seen best in Figure 1 the improved valve 10 of this invention comprises a hollow valve body made up of two intermating parts 11 and 12, preferably constructed of molded nylon or other materials suitable for such purpose. The valve body so constituted includes a hot water inlet 13, a cold water inlet 14 and a discharge outlet 15 (see Figure 2). Electrical solenoid actuated needle valve housings 16 and 17 are held at opposite ends of the valve body by bracket means comprising end plates 18 and 19. Four tie bolts 20 serve to hold such end plates to the valve body parts 11 and 12 and to secure such valve body parts together in end-to-end water-tight relationship.

The upper valve body part 11 includes a substantially cylindrical wall portion 25 from one side of which extends a transversely related cylindrical boss 26 defining the hot water inlet means 13 (see Figure 7). The external walls of the cylindrical boss portion 26 are suitably threaded at 27 for connection with a supply hose or like means. Internally of boss portion 26 a strainer screen 28 is provided outwardly of an apertured metal cage member 29 having a central opening for receiving a central projection 30 of a flapper type rubber check valve 31. It is to be noted that the projection portion 30 of the valve 31 is formed substantially frusto-conical in cross-section so that after the same is inserted through the cage member 29, the lower base portion of such projection expands outwardly beyond the diameter of said central opening in the cage member to lock the flapper check valve 31 in position.

At the inner end of the hot water inlet 13 and at the terminal end of the passageway or chamber 32 therein, the extension of wall portion 25 of the upper housing part 11 is interrupted and provided with an outlet passageway means 33 which communicate with two passageways 34 (see Figure 4) leading to the upper end of the valve body portion 11 and specifically to a first pilot valve means or assembly 35. The valve body portion 11 is further provided with a central axial opening 36 which is distinguished at its outer end by annular conical valve seat 37 which surrounds the upper end of the opening 36. The axial opening 36 communicates with a transverse passageway means 38 which extends between the upper wall 39 of the valve body part 11 and an internal wall 40 thereof. Passageway means 38 junctions with a downwardly extending passageway means 41 which is defined by a substantially semi-cylindrical wall formation 42 (see Figure 7) disposed alongside and outwardly of the cylindrical wall portion 25 of such upper body part 11. Disposed substantially coaxially of opening 36 and centrally of the upper body part 11 beneath wall 40 is a cylindrical cavity 43 which communicates with the inlet passageway means 33 via ports or openings 44 formed through the intermediate internal upper wall 40 registeringly beneath the passageways 34.

The lower valve body portion 12 includes a substantially cylindrical side wall 46 from one side of which extends a cylindrical boss portion 47 having external threads 48 and defining the cold water inlet means 14. Internally of the cylindrical boss portion 47 is disposed a screen member 50 and a second check valve assembly including an apertured cage means 51 and the resilient flapper type check valve 52; the check valve assembly being identical in all respects to the valve means 31 in the hot water inlet as above described. The hollow interior of the boss portion 47 which defines the cold water inlet terminates in an interrupted wall portion 53 having openings 54 therein. Opening 54 communicates directly with a central cylindrical cavity 55 defined by the interior of the cylindrical walls 46 and comprising an axial extension of the cylindrical chamber or cavity 43 formed in the upper valve body portion 11. The internal walls of such cylindrical cavity or depression are inset slightly as at 56 to form a step or shoulder for purposes which will appear presently herein. The lower end of the cylindrical cavity 55 is substantially closed over by an internal wall 57 which defines with a bottom wall 58 of the housing portion 12 a passageway means 59 leading to the discharge outlet means 15 (see Figure 6). Passageway 59 is intersected by a substantially vertical internal passageway means 60 arranged, aligned and communicating with passageway means 41 in the upper valve body portion 12; passageway means 60 being defined by the hollow interior of semi-cylindrical wall portion 61.

The lower internal wall portion of 57 of the lower body part 12 is provided with a pair of passageway means or ports 63 which communicate with a lower pilot valve assembly 64 disposed to cooperate with an annular conical valve seat 65 formed at the lower end of an axial passageway means 66 corresponding to the passageway means or opening 36 in the upper valve body portion left. Such passageway means 66 leads to the passageway means 59 and thus with a discharge outlet means 15.

In assembling the two valve body portions or parts 11 and 12 in end to end abutting engagement, an annular seal 70 is provided in a suitable recess at the lower end of the wall portions 42 of the upper body part 11 and an additional annular seal ring 71 is provided between the lower end of the cylindrical wall portion 25 of the upper valve body 11 and the corresponding cylindrical wall 46 of the lower body portion 12. By tensioning the hold down bolts 20 sufficiently, such seals 70 and 71 are sufficiently compressed to effect a water tight seal at the juncture of such two valve body parts.

It will be recalled that the hot water introduced at inlet 13 communicates with the pilot control valve assembly 35 at the one end of the valve body. The cold water at inlet 14 likewise communicates indirectly with pilot control valve 65 as will appear presently. Such pilot valves are arranged to control the flow of liquids past the two valve seats 37 and 65. Diaphragm members 73 and 74 are respectively provided in the assemblies 35 and 64; such being formed of a flexible material such as rubber. Member 73 has a thickened central annular portion 75 provided with a central axial opening 76 therethrough.

Such opening 76 is reinforced by a metallic sleeve member 77 and a flexible annular portion 78 surrounds the central portion 75. The peripheral edge of the flexible annular section 78 is provided with a bead 79 which engages in a groove 80 formed at the upper end of the housing portion 11. An aperture 81 of smaller diameter than central aperture 76 is formed through the edge of the thickened central portion 75 and a passageway 82 leads from aperture 81 through a raised bead 83 to communicate with opening 76. The diaphragm 74 is identical to diaphragm 73 and such is therefore provided with a thickened central portion 84, a central axial opening 85, an aperture 86 formed through the edge of the thickened central portion and a flexible outer annular portion 87 (see Figure 2).

A needle valve 88 is provided to close the central opening 76 of the diaphragm 73 and a similar needle valve 89 is provided to close central opening 85 of diaphragm 74. The housings 16 and 17 respectively enclose the needle valves 88 and 89 and springs 90 and 91 respectively associated with the needle valves are located within the upper or outer ends of the housings 16 and 17 for biasing the needle valves in directions to close the openings 76 and 85.

The open lower ends of housings 16 and 17 are formed to fit over the open ends of the body parts 11 and 12 outwardly of the diaphragm valves 73 and 74. In this latter regard it will be noted that the bracket members 18 and 19 which are secured by the bolts 20 serve to press the open ends of the valve housings 16 and 17 onto the diaphrgams 73 and 74 thereby tightly compressing the latter into the annular slotted grooves 80 and 92 formed respectively in the outer ends of the body portions 11 and 12.

It will be recognized also that the needle valves 88 and 89 are coaxially aligned at opposite ends of the assembled housing. The needle valve housings in addition to holding the diaphragm valves in position serve to close over the open ends of the housing portions 11 and 12. Thus assembled, the projecting needle valve housings are surrounded by suitable solenoid coils 93 and 94 for attracting the needle valves away from the central orifices 76 and 85 in the diaphragm members.

It will be seen that the central cavities of the two body parts 11 and 12 are arranged coaxially to receive a mixing assembly, indicated generally by numeral 95. Such internal mixing assembly thermostatically controls the passage of water to the outlet 15, as will now be described.

A substantially cylindrical housing cylinder 96, the features of which are best shown in Figure 7, is made of a diameter sufficient to snugly fit in the cylindrical interior of the central chamber formed by the cavities 43 and 55 of the valve body parts 11 and 12. Such housing 96 is preferably made of molded nylon or like material and when disposed as illustrated in Figure 2 within the housing part 12, the same abuts the shoulder portion 56 in cavity 55. In that position port openings 97 therein, communicate with the cold water inlet 14 and particularly with the opening 54 formed in the end wall 53 of such inlet means. The ports 97 lead into a centrally disposed chamber 98 adjacent the lower end of the housing member 96; such chamber 98 being defined by cylindrical walls 99.

The upper end of the cylindrical wall portion 99 for the housing 96 projects upwardly into the central cavity 43 of housing part 11. A metallic seat member 101, formed substantially as an annular ring is disposed within the internal confines of wall 99 with the lower end thereof seating on a ledge 102. The ring 101 carries an annular seal element 103 in its outer side walls to provide a watertight seal with the internal side walls of the housing 96.

A thermal sensitive element 104 is disposed in the housing 96 so that the lower end thereof is received in an opening provided at the lower end of the housing member 96. The main heat sensing portion of such element therefore extends into the lower portion of the central cavity 55 in the body part 12. Downwardly depending fingers 105 on the housing 96 and a conical seat portion 106 near the lower end of housing 96, serve to pilot the thermostatic element 104 and maintain the same in its proper assembled position. A movable piston element 107 of the thermostatic member projects upwardly into a central opening 108 of a hat shaped valve member 109, having a lower flange or valve disc 110. Such flange 110 extends radially outwardly sufficiently to overlie an annular valve seat 111 formed in the housing member 96 and to underlie a similar annular valve seat portion 112 formed in the lower face of ring member 101.

A first spring member 114 extends between the upper end of the annular ring member 101 and the overlying wall portion 40 of the valve body part 11. Such spring member is precompressed a predetermined amount which must be overcome before further compression thereof takes place. A second spring 115 is mounted coaxially within spring 114 to surround the cylindrical body portion of the valve member 109; the lower end of such spring 115 resting on the upper face of the flange portion 110 of the valve member 109 and the upper end thereof being piloted by an annular projection 116 formed on the lower face of wall 40. Spring 115 serves to normally oppose upward movement of the valve member 109 as initiated by the expansion of the piston portion 107 of the thermostatic element. The action of the thermostatic element, serves to move the flange portion 110 of the valve member toward and away from the valve seats 111 and 112, thereby to control the flow of liquids past valve 109. In the event of abnormal expansion of the thermostatic member so that flange 110 is tight against seat 112, the first named spring 114 is compressed to permit upward movement of the ring member 101 and valve 109 to avoid rupture of the internal mixing assembly.

Turning now to Figures 5, 8 and 9 of the drawings, it will be recognized that one side of housing 96, opposite the port openings 97 therein is provided with two vertically extending rib members 118 which extend beyond the normal radial limits of such member to form interlocking projections receptive in longitudinal slotted openings 119 formed in the interior walls of the central cavity 55 in the lower body part 12. Such interlocking of the ribs and slots 118 and 119, respectively, serves to properly locate the housing 96 so that ports 97 thereon lie opposite the exit or outlets 54 of the cold water inlet means 14. It will be noted that intermediate such extending ribs 118 are a pair of discharge passageways 120. Additional passageways 121 are disposed on opposite sides of such member and such provide for the exit of water flowing from the internal chamber 98 across seat 111 and from cavity 43 across seat 112. Thus hot and cold water are permitted to intermix at seats 111 and 112 and to pass via outlet ports or passageways 120 and 121 to the lower section of the central cavity 55 in the housing part 12 where their intermixing is completed adjacent the active body portion of the thermostat 104. Such intermixed water may pass from cavity 55 to the lower pilot control valve means 64 via the outlet passage ports 63, 63.

Normally in assembling the various elements of my improved valve as hereinabove described, the mixing assembly or means 95 is preassembled in the housing 96 and such housing then slipped into the cavity 55 of the lower housing part 12. The spring members 114 and 115 are thereafter disposed in place so as to extend between such assembly 95 and the wall 40 of the upper housing part 11. By then closing the two housing parts 11 and 12 tightly against one another in abutting end-to-end relationship, as hereinabove described, and tightening the holding or tie bolts 20 over the plate members 18 and 19, the spring means 115 is especially compressed to preload the same with a predetermined force which must be overcome prior to the movement of the ring member 103 away from the seat 111 as required during the override function for abnormal expansion of the thermostatic element 104.

Having thus set forth the various elements and portions of my improved device and the assembled relationship thereof, I will now describe the operational aspects thereof.

It may be assumed for purposes of illustration, that the thermostatic element 104 is calibrated for optimum action at 95° F., that the source of hot water connected to the hot water inlet means 13 supplies water at the valve in a temperature zone approximating 160° F. and that the cold water supplied at the cold water inlet means 14 is at a temperature of approximately 50° F. Under these conditions, "hot water" of substantially 160° F. (disregarding heat losses to the valve body, etc.) will be supplied at the outlet 15 if solenoid 93 is energized solely to lift needle valve 88. If, on the other hand, solenoid 94 which lifts needle valve 89 is solely energized "warm" water of about 95° F., will be supplied at the discharge outlet 15. If both solenoids are energized simultaneously so that both needle valves 88 and 89 are lifted from their respective diaphragm members and particularly the central orifices 76 and 85 thereof, "medium" temperature water of substantially 135° F. will be delivered at the discharge nozzle or outlet 15. The specific operation of the valves under these three conditions will be set forth hereinafter.

Hot water discharge

Prior to the lifting of needle valve 88 from its seat, hot water fills the space adjacent the seat 37 and beneath the diaphragm member 73. Such hot water also has access to the upper side of the diaphragm or, that is, the solenoid side thereof via the small bleed passageway 81. Inasmuch as the chambers 38, 41, 60, 59 and discharge outlet 15 are connected to the tub of a washing machine, for example, such contain atmospheric pressure. Therefore, the water pressure exerted on the top side of the diaphragm 73 serves to hold the same against seat 37. When needle valve 88 is lifted from its seat in the aperture 76 by energization of the solenoid coil 93, the diameter of such opening 76 being greater than the diameter of the bleed aperture 81, an unbalance of pressure on the diaphragm is brought about which serves to lift the same from seat 37. Therefore, water escapes into chamber 36, and the passageways 38, 41, 60, 59 leading to discharge outlet 15. Thus hot water is free to flow from inlet 13 via the outlet means 34 to and across the valve seat 37 and thence to the outlet discharge as described. Inasmuch as the solenoid coil 94 which, when energized serves to lift the needle valve 89, is not energized in this condition of operation presently of discussion, diaphragm 74 will remain seated against the seat 65 and accordingly the hot water which passes down through the mixing assembly 95 via the entry port 44 will not pass the pilot control valve 64. When the solenoid coil 93 associated with housing 16 is de-energized, the needle valve 88, biased by spring means 90 moves downwardly to close the opening 76 in the diaphragm member thereby causing water pressure to build up on the top side of such diaphragm through the bleed aperture or passageway 81 to eventually force the same tightly against seat 37.

Warm water discharge

In order to supply "warm" water at the discharge outlet 15, only the solenoid 94 associated with housing 17 and needle valve 89 is energized. Prior to the time the needle valve 89 is lifted from its seat in opening 85 of the diaphragm member 74, the latter member is held in closed condition against seat 65 by the water pressure exerted on the solenoid side of such member as transmitted by bleeder aperture or passageway 86. Therefore, by energizing solenoid 94 and lifting the needle valve 89, diaphragm 74 is lifted from seat 65 in the same manner described hereinabove for the operation in lifting diaphragm 73. The closing of such pilot valve assembly 64 by water pressure after de-energizing solenoid 94 is likewise the same as for the pilot valve assembly 35 and so such will not be redescribed herein.

Before needle valve 89 is lifted from its seat, the valve disc 110 of the valve member 109 lies in an intermediate position between the seat members 111 and 112 depending on the thermal conditions affecting the thermostatic member 104 as imposed by water temperature, radiation heat loss, ambient temperature and like factors. When needle valve 89 is lifted, pilot valve means 64 opens. Hot water flows through the inlet means 13 and through the port 44 into the upper end of the cavity 43 in the housing part 11. The same said hot water passes to the valve disc 110 and is throttled between the valve seat 112 and such disc member 110 to communicate with the by-pass passageways 120—121. Cold water passes through inlet means 14, past check valve 52, through outlet opening 54 and the port means 97 into mixing chamber 98. The position of the valve disc 110 relative to the seats 111 and 112 determines the relative quantities of hot and cold water passing into passageways 120 and 121. The water flows through the passageways 120 and 121 into the lower end of cavity 55 of the lower body part 12 mixing as it flows. At this position, such mixed water surrounds the body of the thermosensitive element 104 causing the same to react for controlling the position of the valve 110 and such mixed water is discharged via the outlet port or passageway means 63 to the pilot valve means 64 whereat it passes between the diaphragm member 74 and the valve seat 65 into passageways 66 and 59 leading to the discharge outlet 15.

The contents of the thermosensitive element 104 are so compounded that water in the neighborhood of a preselected temperature, for example 95° F., permits a relative slight change in water temperature surrounding the body portion of the element 104 to cause extended movement of the piston or movable portion 107 thereon. This contrasts to the amount of movement of such piston or movable element produced by a given temperature change at a lower or higher temperature, for example. Accordingly, it will be understood that if the temperature of the water surrounding the body of the thermosensitive element 104 is below the temperature for which the element is calibrated (i. e. about 95° F.), the valve disc 110 will occupy a position closer to seat 111 than to seat 112. In this condition cold water passes from chamber 98 between the lower face of the valve disc 110 and seat 111, to enter the bypass passageway means 120 and 121. Simultaneously, hot water passes between the upper face of valve disc 110 and the over disposed seat 112 to enter the bypass chambers 120 and 121 leading to the lower end of cavity 55 surrounding the thermostatic element 104. Intermixture of the hot and cold liquids takes place partially in the mixing chamber 98 and to a greater degree during the flow of the hot and cold streams through the bypass passageway means 120 and 121. Due to the fact that the spacing of the valve disc 110 from seat 112 is greater than the spacing thereof from seat 111, a greater quantity of hot water than cold water will flow through passageway means 120 and 121.

Such disproportion between the quantities of hot and cold water will result in an elevated temperature of the mixed water in the cavity surrounding the body portion of the thermostatic element. Under this condition the piston or movable portion 107 thereof will move the valve member 109 toward seat 112 to throttle the flow of hot water and increase the flow of cold water.

Thereafter, if the temperature of the water surrounding the body portion of the thermostatic element becomes less than the temperature for which such element is calibrated, the valve 104 and particularly the disc portion 110 thereon will be moved toward the lower or underneath disposed seat 111. Thus it is seen that the valve 109 assumes a position, when water is flowing through the hot and cold water inlets, which results in mixed water of a predetermined temperature (95° F. plus or minus 5° F. for a calibration temperature of 95° F.) which is discharged past the pilot valve means 64, providing of course that the temperature of the hot water supply is 95° F. or above and the temperature of the cold water supplied is 95° F. or below.

In a typical case, when hot water is supplied to the valve at a temperature of 160° F. and cold water is supplied to the valve at a temperature of 50° F. and with only the solenoid 93 energized to lift needle valve 89, the temperature of the water discharged at nozzle 15 will be substantially 95° F. plus or minus 5°

Medium water discharge

To supply "medium" temperature water both the solenoid means 93 and 94 associated respectively with the needle valve members 88 and 89 are energized. The two pilot control valves and particularly the diaphragm members 73 and 74 thereof are thus lifted from their respective seats 37 and 65 all in the manner described hereinabove. Hot water passes from the inlet 13 through the discharge passage means 33, past the diaphragm 73 and valve seat 37 into the passageway means 38, 41, 60 and to the discharge outlet means 15. The hot water also passes from discharge outlet 33, through the discharge port or passageway means 44, into the cavity 43 of the upper valve body part 11, downwardly past the seat 112 and valve disc 110 to the bypass passageway means 120 and 122 and thence to the cavity surrounding the body of the thermostatic element 104. During the latter described passage of the hot water to the thermostatic element 104, such hot water is intermixed with the cold water entering from inlet means 14 through opening 54, port means 97 to chamber 98 and then via the space between the lower face of the valve disc 110 and the lower seat 112 to passageways 120 and 121 as hereinabove described. The "warm" mixture of hot and cold water passes from the lower portion of cavity 55 surrounding the body of the thermostatic element through the passageway means 63, past the valve seat 65 and into the passageway means 66 and 59. Hot water moving through passageway 60 meets the "warm" water in passageway 59 at the junction of such two passageway means and the temperature of the water discharged at the discharge outlet 15 accordingly will be modified to the temperature intermediate the "hot" and "warm" water temperatures producing the medium temperature mixture desired.

For example, if hot water is supplied to the valve at a temperature of approximately 160° F. and the 95° plus or minus 5° F. "warm" water mixture in passageway 59 mixes with such "hot" water, the resulting "medium" temperature water will be at approximately 135° at the discharge nozzle 15. It will be recognized therefore that when both the solenoids are energized the valve operates in a manner combining the separate operations brought about by the individual actuation of the two separate solenoids.

In order to insure an adequate supply of hot water through passage 44 into the mixing assembly when the pilot valve means 35 is open so that hot water passes through both the discharge passageway means 60 and to the mixing chamber, an orifice plate 130 may be provided between the body parts 11 and 12 at the junction of the hot water passageway means 41 and 60. Such orifice plate serves to provide an obstruction to the otherwise relatively unrestricted flow through the hot water passageway means 41 and 60, thereby providing approxiway means as will be encountered by the hot water moving through the mixing portions of the valve.

From the foregoing it is believed that those familiar with the art will readily recognize and understand the features and improvements of the valve of this invention and that while the invention has been related to a specific structural embodiment and typical operating conditions and values, obviously various changes, modifications and substitutions of equivalents may be made therein without necessarily departing from the spirit and scope of the invention herein disclosed. As a consequence it is not my intention to be limited to the particular form of the invention hereinabove described and shown in the accompanying drawings except as may appear in the following appended claims.

I claim:

1. In a mixing valve of the class described, a valve body forming a central cylindrical chamber, a hot fluid inlet communicating with one end of said chamber, a cold fluid inlet communicating with the opposite end of said chamber, a disc valve means mounted coaxially in said chamber, a pair of valve seats, each contiguous to one face of said valve means, one of said seat means being movable coaxially of said chamber, thermosensitive means engaged with said valve means for moving the same toward said one valve seat, first spring means resiliently opposing movement of said valve means toward said one valve seat, second spring means opposing movement of said one valve seat away from said valve means, first passageway means communicating at one end with said chamber opposite said valve means with the latter serving to proportion the quantities of hot and cold fluids entering such passageway means, mixing chamber means communicating directly with the other end of said passageway means and surrounding said thermosensitive means whereby said valve means is moved by the latter in response to temperature of intermixed fluids substantially at their point of intermixture, and pilot valve means controlling the flow of fluids from said mixing chamber to said outlet means.

2. In a mixing valve of the class described, a two part valve body, each part having a central cylindrical cavity with such cavities co-operating to form a central cylindrical chamber in the assembled valve, a hot fluid inlet communicating with the said cavity in one body part, a cold fluid inlet communicating with the said cavity in the other body part, a disc type valve member mounted coaxially of the said chamber between said inlets, a first annular seat means in said chamber contiguous to one face of said disc valve member, a second annular seat means in said chamber contiguous to the opposite face of said disc valve member, said second seat means being movable relative to said valve member, a thermosensitive element in said chamber having an active portion and a movable piston; a mixing chamber surrounding said active portion, the said piston engaging said valve member for moving the latter toward said second seat means, first spring means opposing movement of said valve member toward said second seat means, second spring means opposing the movement of said second seat means away from said valve means, and passageway means communicating between said chamber opposite said valve means and the said mixing chamber surrounding said active portion of the thermosensitive element, said valve means serving to proportion the flow of hot and cold fluids entering said passageway means and said thermosensitive element responding to the temperature of intermixed fluids in said mixing chamber to control the positioning of said valve means intermediate said two named seat means.

3. In a mixing valve of the class described, a valve body having a central chamber, a first fluid inlet communicating with said chamber, a second fluid inlet communicating with said chamber, a fluid discharge outlet, first passageway means communicating between said first fluid inlet and said chamber, second passageway means communicating between said first fluid inlet and said discharge outlet, third passageway means communicating between said second fluid inlet and said chamber, a disc type valve member mounted in said chamber between the points of discharge for said first and second fluids thereinto, a housing member mounted in said chamber and providing a first annular seat for said valve member, an annular seat member within said housing providing a second annular seat for said valve member, said two named seats being spaced to accommodate movement of said valve axially along said chamber, said seat member being movable axially of said chamber, a thermosensitive element having an active portion held in said housing and a movable piston portion engaging said valve means to move the latter toward said seat member, first spring means opposing movement of said valve means toward said seat member, second spring means opposing movement of said seat member away from said valve member, fourth passageway means communicating directly between the spacing between said two seats and the lower end of said chamber below said housing, the movement of said valve means between said two seats serving to proportion the quantities of first and second fluids entering said fourth passageway means, with said fourth passageway means supplying the intermixed first and second fluids around the active portion of said thermosensitive element, fifth passageway means leading from the lower end of said chamber to said discharge outlet, and second and third valve means in said second and fifth passageway means respectively for controlling the flow of liquids therethrough selectively.

4. A fluid mixing valve, comprising, an open ended body having a central cavity defining a cylindrical chamber, closure means for the open ends of said body, first passageway means communicating with one open end of said body, second passageway means communicating with the other open end of said body, first and second valve members at said closure means operable individually for respectively controlling the flow of fluids through said first and second passageway means, a hot water inlet communicating with said first passageway means, a cold water inlet communicating with said central chamber, an outlet means communicating with said first and second passageway means beyond said first and second valve means, a cylindrical housing established in said chamber, a thermosensitive element carried in said housing, a disc type valve engaged by said thermosensitive element for movement coaxial of said housing's interior, a first seat means provided by said housing for engaging one face of said disc valve, an annular seat member providing a second seat means for the other face of said disc valve mounted in said housing for movement coaxially thereof, said thermosensitive element serving to move said disc valve toward said seat member, first spring means opposing movement of said disc valve toward said seat member, second spring means opposing movement of said seat member away from said disc valve, and third passageway means communicating between the interior of said housing opposite the periphery of said disc valve and said second valve member, said third passageway means including a mixing chamber surrounding said thermosensitive element whereby the latter responds to temperatures of intermixed fluids substantially at their point of intermixture in said mixing chamber, the individual operation of said first valve member permitting the flow of hot liquids through said first passageway means, the individual operation of said second valve member permitting the passage of intermixed hot and cold fluids from said mixing chamber through said third and second passage way means, and the operation of said valve members simultaneously causing the discharge of said hot and intermixed fluids at said outlet.

5. In a mixing valve of the class described, a valve body having an internal cylindrical chamber, first fluid inlet means in said valve body, second fluid inlet means in said valve body, a discharge outlet means, first passageway means communicating from said first fluid inlet means to the central chamber of said valve body, second passageway means communicating from said first fluid inlet means to said outlet means, third passageway means communicating from said second fluid inlet means to said central chamber, a disc valve means disposed in said chamber between the points at which said first and third passageway means discharge thereinto, a first annular seat means disposed contiguous to one face of said disc valve means, a second annular seat means disposed contiguous to the opposite face of said disc valve means, said second annular seat means being movable relative to said disc valve means, a thermosensitive unit disposed in said chamber including an active portion and a movable piston engaging said disc valve means for moving the same toward second seat means, first spring means resiliently opposing the said movement of said disc valve means toward said second seat means, second spring means opposing the movement of said second seat means away from said disc valve means, annular outlet means in said chamber substantially opposite said disc valve means and between said two seat means, fourth passageway means leading from said outlet means to said discharge outlet for carrying an intermixture of said first and second fluids from said chamber, said fourth passageway means channelling the flow of such intermixed fluids across the active portion of said thermosensitive means whereby the latter member thermally responds to the temperature of such intermixed fluids, and first and second pilot valve means mounted respectively in said second and fourth passageway means for controlling the flow of liquids therethrough, said second pilot valve means being located beyond said thermosensitive element in said fourth passageway means, the said pilot valve means being individually and selectively operable, with the operation of said first pilot valve means permitting the flow of said first fluid directly to said discharge outlet, the individual operation of said second pilot valve means permitting the flow of mixed fluids to said discharge outlet, and the operation of both of said pilot valve means simultaneously permitting the flow of both said first and intermixed fluids to said discharge outlet.

References Cited in the file of this patent

UNITED STATES PATENTS

| | | |
|---|---|---|
| 799,505 | Wadsworth | Sept. 12, 1905 |
| 2,172,489 | Young | Sept. 12, 1939 |
| 2,245,171 | Wetzel | June 10, 1941 |
| 2,620,134 | Obermaier | Dec. 2, 1952 |